US007027430B1

(12) United States Patent
Ramey (10) Patent No.: US 7,027,430 B1
(45) Date of Patent: Apr. 11, 2006

(54) COMMUNICATION NETWORK UTILIZING AUTONOMOUS SERVERS TO ESTABLISH A COMMUNICATION SESSION

(75) Inventor: Kenneth Scott Ramey, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/181,823

(22) Filed: Oct. 29, 1998

(51) Int. Cl.
*H04L 12/66* (2006.01)

(52) U.S. Cl. .................... 370/352; 370/395.2
(58) Field of Classification Search ........ 370/352–365, 370/395.52, 401, 386, 400, 395.21; 709/203, 709/208, 209, 211, 213, 219, 220, 250
See application file for complete search history.

(56) References Cited

U.S. PATENT DOCUMENTS

| 5,742,596 A | | 4/1998 | Baratz et al. |
| 6,133,912 A | * | 10/2000 | Montero ............ 345/327 |
| 6,269,370 B1 | * | 7/2001 | Kirsch ............... 707/10 |
| 6,324,265 B1 | * | 11/2001 | Christie, IV et al. .... 379/88.23 |

FOREIGN PATENT DOCUMENTS

| EP | 0 829 995 A2 | 3/1998 |
| EP | 0 963 096 A2 | 12/1999 |
| WO | WO 97/314492 A | 8/1997 |
| WO | WO98/16051 A | 4/1998 |

OTHER PUBLICATIONS

PCT Written Opinion, Sep. 15, 2000 PCT/CA99/01004.
International Preliminary Examination Report, Feb. 2, 2001, European patent Office.

* cited by examiner

*Primary Examiner*—Brenda Pham (57) ABSTRACT

An architectural model is proposed which enables the breaking of the dedicated bond between voice-oriented peripheral equipment (PE) based resources and the voice call processing services that classically reside in PBXs, Central Offices, and Key Systems. In addition to being able to physically remote voice PE across data networks, this model enables the voice PE to become a shareable, network-owned resource (as per a Distributed Client/Server model) rather than the dedicated, non-shareable resource of a single voice host attached to the network. This places the voice PE in the same league that data resources (eg bridges, routers, . . . ) and server-based applications have always been. Disjoint voice products based upon this proposed architectural model would likewise be able to simultaneously share voice PE resources, thereby enabling equipment concentration and it's corresponding cost reductions at network level, as well as PE-based sparing/redundancy. In addition, a new, more powerful usage paradigm is described for the telephone that resembles that of the PC. Of course, nothing prevents the network from being configured with only a singleton voice client utilizing the various servers. This degenerate case then corresponds to a distributed, but still logically unbundled PBX complete with traditional telephones.

7 Claims, 6 Drawing Sheets

COMMUNICATION NETWORK UTILIZING AUTONOMOUS SERVERS TO ESTABLISH A COMMUNICATION SESSION

FIELD OF THE INVENTION

The present invention relates to a communications network for supporting voice communication sessions and possibly data communication sessions as well. In a specific embodiment, the communication network features servers forming nodes of the network that can manage in an autonomous and shareable fashion the functions that must be completed to establish and maintain a voice communication session. Such communication network is particularly well suited to effect the function of a traditional PBX (Private Branch Exchange).

BACKGROUND OF THE INVENTION

Today's typical PBXs are essentially comprised of a collection of different types of Peripheral Equipment (PE) and a call processing applications all subtending from a single or hierarchical Time Division Multiplexing (TDM) switch. The types of PE typically found include those dedicated to line side access (i.e., telephone termination) support, trunk side access (i.e., network termination), and centralized, shareable resources such as conference bridges, echo cancellers, and Dual Tone Multi-Frequency (DTMF) receivers, to name a few. In each of these cases, all of them are rather tightly bundled together in terms of not only physical packaging, but more importantly, in terms of Operation and Management (OAM). The main function of a PBX being call processing, the relationship between it and each PE is "one-to-one", "dedicated", and "ownership-based". Call processing not only maintains the state of calls, it also maintains the state of users, telephones, trunks, conference bridges, etc., and defines the usage paradigm. Telephone resources (e.g., keys, lamps, displays, speaker, etc.) and contention for them, are not managed by the phone itself, but rather by the call processing application subject to the same ownership paradigm. For example, any adjunct application such as a voice Mail (VM) can only access/control PBX and terminal resources indirectly through the call processing application, since it is the call processing application that 'owns' these resources, keeps state information for them, etc. Furthermore, a user trying to context select between an existing call and a call waiting or a call on hold, must interact with call processing rather than the terminal.

This model lacks flexibility and does not provide the opportunity to share the voice PE resources. A system providing these advantages would inherently give users enhanced services.

OBJECTIVES AND SUMMARY OF THE INVENTION

An object of this invention is to provide a novel communication network that has a decentralized architecture.

Another object of the invention is to provide a novel method for establishment of voice communication sessions in a communication network that has a decentralized architecture.

Another object of the invention is to provide a server capable of interacting in an autonomous fashion with another node of a communication network to execute a function necessary to establish a voice communication session.

Yet, another method is to provide a novel method for completing autonomously a function necessary to establish a voice communication session in a communication network.

As embodied and broadly described herein, the invention provides a distributed system for establishing a voice communication session, the voice communication session being established by executing succession of functions, said distributed system comprising:
  a. a client device constituting an originating point of the voice communication session;
  b. a plurality of servers capable to be placed in a data communicative relationship with said client device, each server being capable of establishing a data exchange transaction with the client device to execute a certain function of the communication session,
  c. each server being characterized in that it establishes a data exchange transaction with said client device in a manner autonomous from a data exchange transaction between said client device and a different server.

In typical PBXs, the functions that must be executed to establish a voice communication session, either internal or external, are all centrally managed. More, specifically, there is a tight coupling between the voice call processing services and peripheral equipment (PE) based resources and terminals which are bound into and dedicated to that PBX. Call Processing typically presides over the operation, control, and management of these resources. This dedicated bond is an obstacle to the sharing of these components/resources by applications other than Call Processing, unless the new function accesses the PE and/or terminals by going through Call Processing. Hence Call Processing potentially becomes a point of inflexibility with respect to adding new application services.

The distributed system for establishing a voice communication session, as generally defied above is a novel architectural model where the different functions that must be executed to establish a voice communication session are autonomously effected, preferably by different specialised entities, rather than being all under the control of one central processor. The invention can be used to provide an improved PBX system that no longer requires both the physical and the logical bundling of the components necessary to establish a voice communication session. This enables those components to become a shareable, open, network-owned, autonomous resources.

In a specific example, the distributed system for establishing a voice communication session is build around a network including a plurality of nodes that communicate according to the IP protocol. The system includes at least one client device forming a node of the network from which typically, the voice communication session originates. In order to establish the voice communication session, a number of functions must be executed. The execution of those functions is effected by invoking dedicated servers that reside at other nodes of the network. To cause execution of a certain function the client device communicates with the server responsible for this function and requests the necessary services from it. When the execution of the function is completed, the server resources are released. An important aspect of the transaction client/server is that it is autonomous. Typically, the server will respond to a request to execute the transaction and it will do so in a manner autonomous from a function that has been executed previously or a function that is to be executed subsequently in the functions chain to establish the voice communication session.

As embodied and broadly described herein, the invention further provides a private branch exchange network to permit establishment of internal and external voice communication sessions, each voice communication session being execution of a series of functions, said private branch exchange network including:
  a. a plurality of servers in a data communicative relationship, each server capable of interacting autonomously from other servers with telephone instruments connected to said network to execute a certain function a voice communication session;
  b. said plurality of servers including a PSTN access server to connect said network and the PSTN for establishment of external voice communication sessions.

As embodied and broadly described herein, the invention further provides a private branch exchange network to permit establishment of internal and external voice communication sessions, said private branch exchange network including;
  a. a plurality of nodes capable of communicating with one another by exchange of data packets to establish and conduct a voice communication session;
  b. said network including at least one node capable of forming a gateway with a PSTN to permit establishment of external voice communication sessions.

As embodied and broadly described herein, the invention further provides a method for establishing a voice communication session, the voice communication session being established by the execution of a series of functions, said method comprising;
  a. providing a client device at which the communication session originates;
  b. providing a plurality of servers, each server being capable to interact with said client device to execute a certain function of the communication session; and
  c. establishing a plurality of autonomous data exchange transactions between said client device and said servers to execute a series of functions permitting establishment and conduction of a voice communication session.

DESCRIPTION OF A PREFERRED EMBODIMENT

Figure 1:
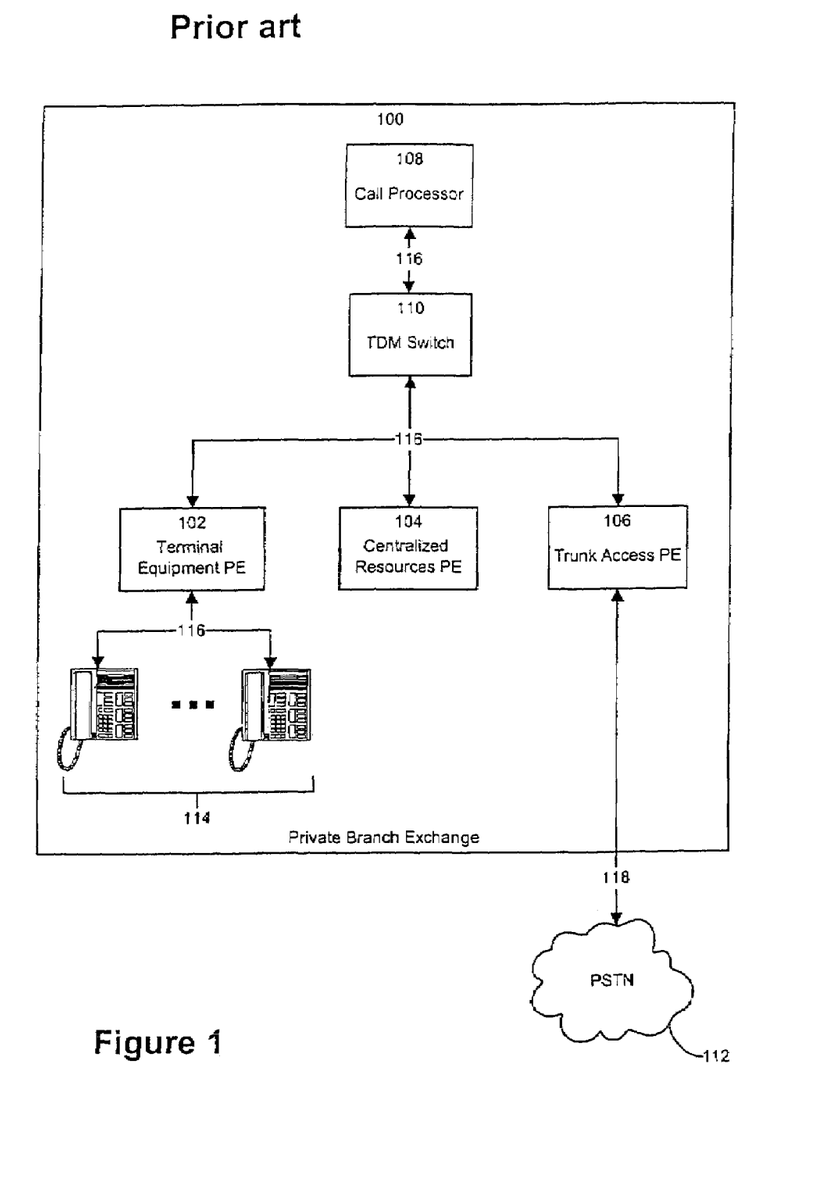
FIG. 1 is a block diagram of a prior art private branch exchange.

FIG. 1 is a block diagram of a prior art PBX system. A typical PBX 100 is essentially comprised of a collection of different types of PE, namely a terminal equipment PE 102, a centralized resources PE 104, and a trunk access PE 106, and a call processing block 108 all subtending from a single or hierarchical TDM switch 110. The communications lines 116 between the above components are of a proprietary nature meaning that they may differ from one manufacturer to the next. Terminal equipment PE 102 are dedicated to line side access; that is, they provide access to the terminal equipment 114 accessed by the end-users. Trunk access PE 106 provide a network termination point for access to the Public Switched Telephone Network (PSTN) 112. The centralized resources PE 104 provides shareable resources to the PBX 100 such as conference bridges, echo cancellers, and DTMF receivers, to name a few. In each of these cases, all of the components of the PBX 100 are rather tightly bundled together not only in terms of physical packaging, but more importantly, in terms of Operation and Management (OAM). The relationship between the call processing block 108 and each PE (102, 104 and 106) is "one-to-one", "dedicated", and "ownership-based". The call processing block 108 not only maintains the state of calls, it also maintains the state of users, telephones, trunks, conference bridges, etc., and defines the usage paradigm. Terminal equipment 114 resources (e.g., keys, lamps, displays, speaker, etc.) and contention for them, are not managed by the terminal 114 itself, but rather by the call processing block 108 subject to the same ownership paradigm. For example, any adjunct application such as a Voice Mail (VM) can only access/control PBX 100 resources and terminal equipment 114 resources indirectly through the call processing block 108, since it is the call processing block 108 that "owns" these resources, keeps state information for them, etc. Furthermore, a user trying to context select between an existing call and a call waiting or a call on hold, must interact with the call processing block 108 rather than the terminal equipment 114.

Figure 2:
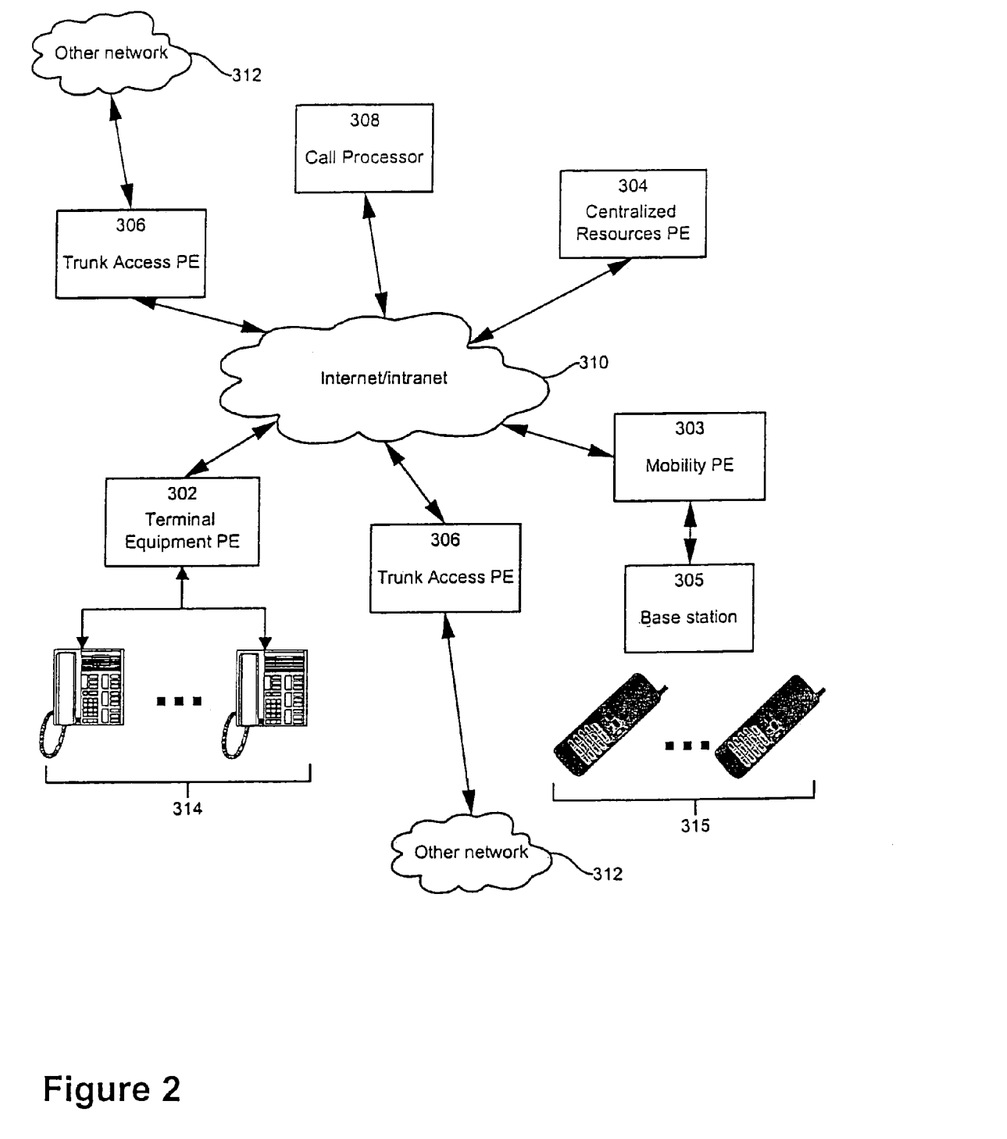
FIG. 2 is a block diagram of a distributed private branch exchange known in the prior art.

FIG. 2 is a block diagram of a distributed PBX known in the prior art. With the advent of integrated voice/data networks based on higher speed transport technologies and switches, the tendency in the PBX world thus far seems to be to break apart the key building blocks of the PBX and distribute them around the integrated voice/data network as depicted in FIG. 2. Whilst doing so provides yet another means of remoting PE (302, 304 and 306) (instead of via the traditional TDM/PSTN network), eliminates the TDM switch 110, and provides an opportunity to locate some of the PE (302, 304 and 306) in a wiring closet possibly co-resident with and even integrated with some data equipment (e.g., routers), it unfortunately still doesn't break the "ownership-based", "dedicated", "one-to-one" relationship between the call processor 308, it's usage and management paradigms, and the distributed PE (302, 304 and 306). The Internet/Intranet 310 becomes in effect, the "switch". Any other application that gets "plugged in" to the network is unable to interwork with telephones, use conference bridges, or trunks without going through the call processor 308 first, and thereby inheriting it's usage paradigm, or an overlay upon it. Not only is the call processor 308 a candidate for bottlenecking, it also precludes concentration opportunities and represents a single point of failure in the network. Concentration being defined as the provisioning of resources in view of the possibility of sharing those resources based on their statistical usage and ensuring a certain level of availability of the resources to the users. In short, although physically unbundled, a distributed PBX as shown in FIG. 2 is still very much logically bundled.

Figure 3:
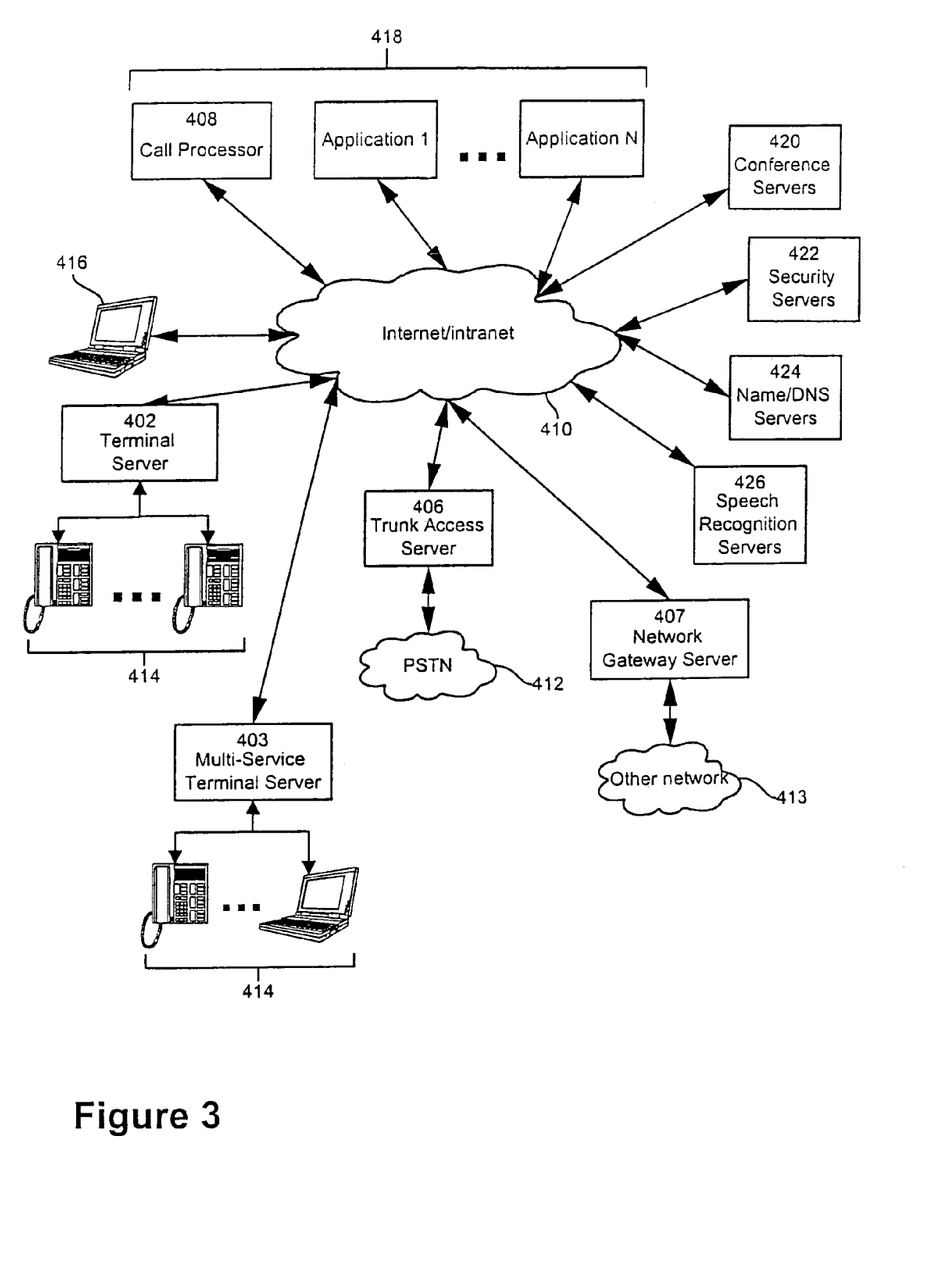
FIG. 3 is a block diagram of a novel network, in accordance with an embodiment of the invention, distributing the private branch exchange functions across a network in a client/server based relationship.

In FIG. 3, the communication network according to the invention is of distributed nature and includes a plurality of nodes in the form of the servers 402, 403, 406, 407, 426, 424, 422 420 and 418. Namely, the network includes a terminal server 402 that supports telephone instruments, applications server 418 providing call processing functions, trunk access server 406 that forms a gateway with the PSTN, multi-media terminal server supporting telephone instruments and computing devices 414, and specialized functions servers such as the conference server 420, security server 422, Name/DNS server 424, speech recognition server 426 and a network gateway server 407 to permit connection to other networks. These servers in the network interact with one another in a client/server relationship to establish a voice communication session and also, if desired a data communication session. More specifically, when a voice communication session is to be established a series of functions must be executed. The voice communication session originates at one of the nodes of the network that request the execution of these functions from servers that may be located remotely from the origin. The server at the origin, in this particular case acts as a client since it requests services from other entities in the network. The distinction between client and server is a logical one since a node may acquire either function depending on whether it is requesting services or giving services. During the execution of a certain function, the client, say the terminal server 402, communicates through exchange of IP data packets with the server, say the speech recognition server 426 to effect a transaction. Such transaction could be the recognition of a name uttered by the user at the telephone instrument connected to the terminal server 402. The execution of the speech recognition function would thus involve the transmission of the uttered name to the server 426, the speech recognition procedure and the return of the result by the server 426 to the terminal server 402, again by exchange of IP data packets. This would then conclude the transaction. As it appears from this simple example, the transaction between the client 402 and the server 426 is autonomous and it does not involve any other entity.

The establishment of a voice communication session thus proceeds by the execution of a series of functions, each function involving an interaction client/server. Preferably, each interaction client/server is autonomous.

Figure 4:
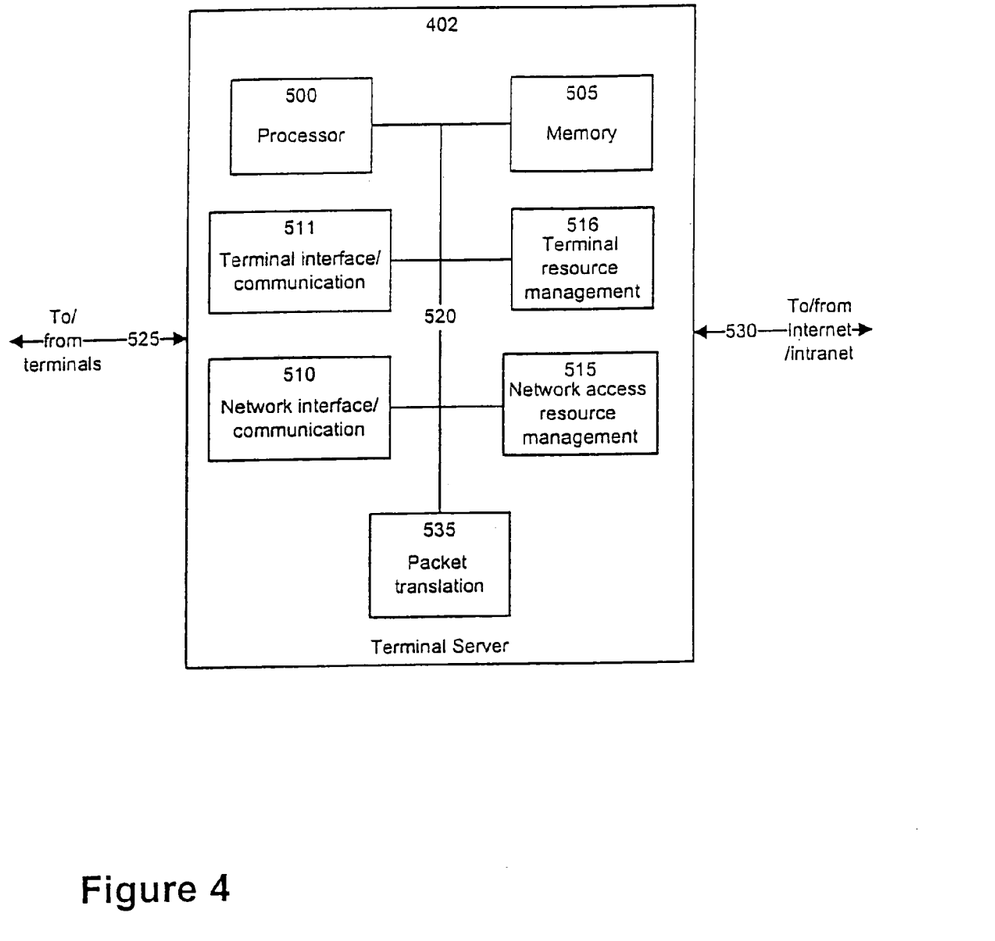
FIG. 4 is a block diagram of a novel terminal server for voice peripheral equipment in accordance with an embodiment of the invention.

FIG. 4 is a block diagram of the terminal server for voice peripheral equipment in accordance with an embodiment of the invention. The terminal server 402 includes a processor 500, a memory 505, a terminal interface/communication block 511, a network interface/communication block 510, a terminal resource management block 516, a network access resource management block 515, a packet translation block 535 and a bus 520 for internal communications between each of the above components. The terminal server 402 communicates with external components via two input/output lines. Input/output 525 is used for communication with the end terminal 414 while input/output 530 for communication with the Internet/Intranet 410. A proprietary protocol may be used on input/output 525 to interface with the terminals 414 while an open protocol is used on input/output 530 to interface with the Internet/Intranet 410. This open protocol could be the Internet Protocol (IP) at level 3 while those at higher levels may be different depending on the components involved.

The memory 505 is used for storing the software necessary to run the other components of the terminal server 402. Memory 505 is also used for storing information downloaded from the other components of the network. This type of information could be parts of or complete applications. The portion of the application that is downloaded depends on where it is more efficient process each part of the application. For example, it is often more efficient to run the user interface as close as possible to the end-user. Finally, memory 505 is also used for buffering packets of information when they are sent out to or received from external components.

The terminal resource management block 516 monitors, manages and controls the state of the terminal equipment 414 resources (keys, lamps, displays, speaker, microphone, etc.). Similarly, the network access resource management block 515 monitors, manages and controls the state of network access resources (not shown).

The network interface/communication block 510 builds, sends, reads and responds to the packets of information to/from the network 410 in the appropriate protocol. Similarly, the terminal interface/communication block 511 builds, sends, reads and responds to the packets of information to/from terminals 414.

The processor 500 runs all other software required for the internal workings of the terminal server 402. For example it would control flow of information on bus 520 and determine which software has priority in different situations.

The packet translation block 535 is responsible for translating the packets to/from the Internet/Intranet 410 communication format to/from the information format used to communicate with the terminals 414.

Figure 5:
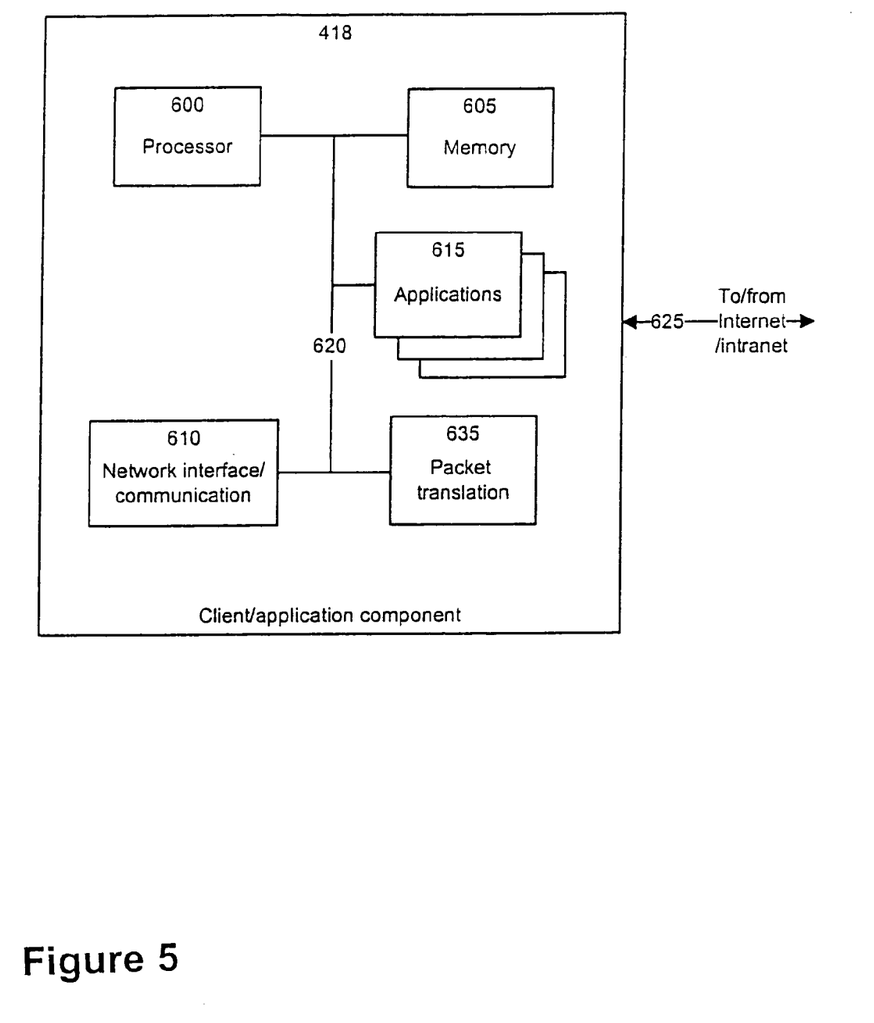
FIG. 5 is a block diagram of a novel client/application component, in accordance with an embodiment of the invention, capable of providing applications to other network components in an autonomous fashion.

FIG. 5 is a block diagram of a novel client/application server (one of 418), in accordance with an embodiment of the invention, capable of providing applications to other network components in an autonomous fashion.

The client/application server 418 includes a processor 600, a memory 605, a network interface/communication block 610, an applications block 615, a packet translation block and a bus 620 for internal communications between each of the above components. The client/application component 418 communicates with external components via input/output 625 that is for communication with the Internet/Intranet 410. An open protocol is used on input/output 620 to interface with the Internet/Intranet 410. This open protocol could be the Internet Protocol (IP) at level 3 while those at higher levels may be different depending on the components involved.

The memory 605 is used for storing the software necessary to run the other components of the client/application component 418. Memory 605 is also used for storing information downloaded from the other components of the network. Finally, memory 505 is also used for buffering packets of information when they are sent out to or received from external components.

The applications block 615 holds the software to run the applications requested by the other components of the network. It will usually hold a bank of the same application in order to answer the request of all components of the network according to statistical usage.

The network interface/communication block 610 builds, sends, reads and responds to the packets of information on the network 410 in the appropriate protocol.

The processor 600 runs all other software required for the internal workings of the client/application component 418. For example it would control flow of information on bus 620 and determine which software has priority in different situations.

Figure 6:
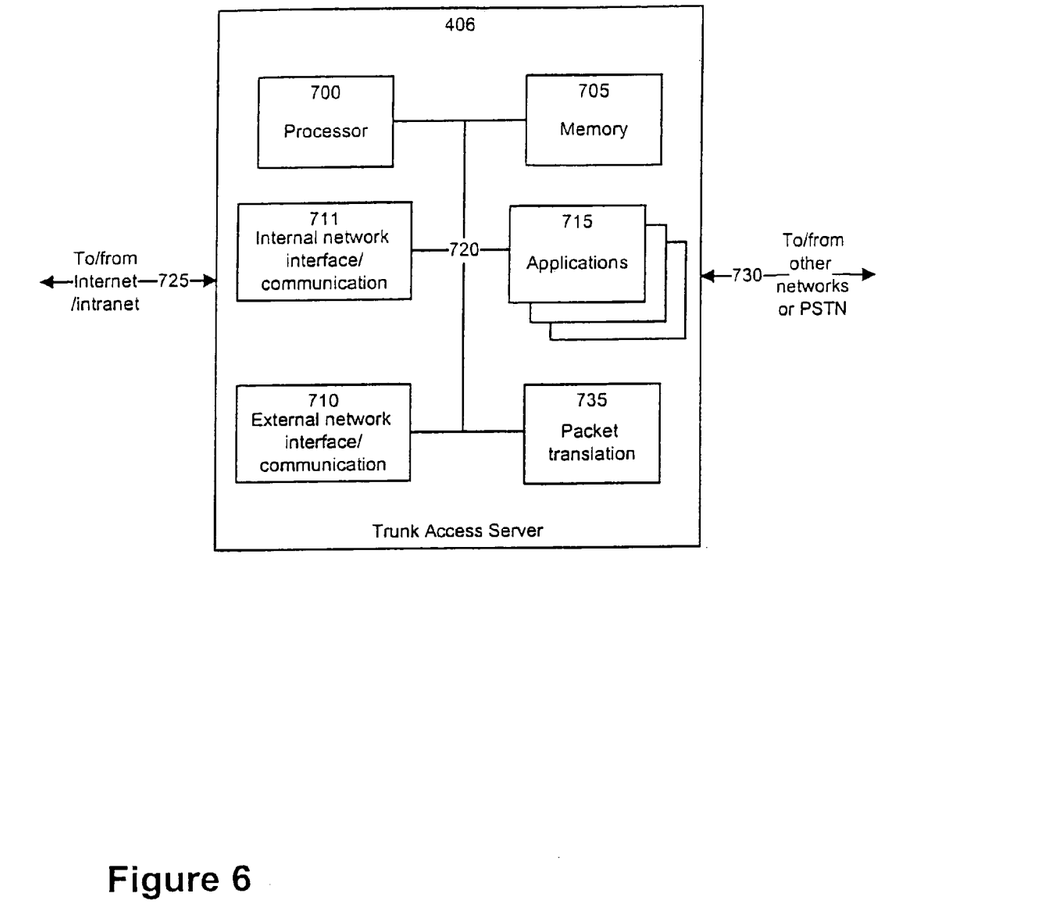
FIG. 6 is a block diagram of the trunk access server 406 in accordance with an embodiment of the invention.

FIG. 6 is a block diagram of the trunk access server 406 in accordance with an embodiment of the invention. The trunk access server 406 includes a processor 700, a memory 705, a internal network interface/communication block 711, a external network interface/communication block 710, an applications block 715, a packet translation block 735 and a bus 720 for internal communications between each of the above components. The trunk access server 406 communicates with external components via two input/output lines. Input/output 730 is used for communication with other networks or the PSTN while input/output 730 for communication with the Internet/Intranet 410.

The memory 705 is used for storing the software necessary to run the other components of the trunk access server 406. Memory 705 is also used for storing information downloaded from the other components of the network. This type of information could be parts of or complete applications. The portion of the application that is downloaded depends on where it is more efficient process each part of the application. For example, it is often more efficient to run the user interface as close as possible to the end-user. Finally, memory 705 is also used for buffering packets of information when they are sent out to or received from external components.

The network interface/communication block 711 builds, sends, reads and responds to the packets of information to/from the network 410 in the appropriate protocol. Similarly, the terminal interface/communication block 710 builds, sends, reads and responds to the packets of information to/from the PSTN 412.

The processor 700 runs all other software required for the internal workings of the trunk access server 402. For example it would control flow of information on bus 720 and determine which software has priority in different situations.

The packet translation block 735 is responsible for translating the packets to/from the Internet/Intranet 410 communication format to/from the information format used to communicate with the PSTN 412.

The applications block 715 holds the software to run the applications requested by the other components of the network. It will usually hold a bank of the same application in order to answer the request of all components of the network according to statistical usage.

The other servers have not been described in detail. Structurally, they are similar to the servers described above, the difference lying primarily in the software executed by the local processor that donates them distinct function execution abilities.

The following text describes an example of establishment of an outside voice communication session (i.e., to a terminal across the PSTN 412) from one of the terminals 414. The first step to this process is when the terminal 414 goes off-hook. The off-hook state is detected by the terminal interface/communication block 511 and this information is passed on to terminal resource management block 516. Block 516 interprets this information, prepares a message comprising the off-hook information and determines where to send the message.

Block 516 then sends the message to the network interface/communication block 510 with the appropriate addressing (i.e., the addresses of the receiver and sender). Block 510 prepares the packet in the appropriate protocol (e.g., (IP) Internet Protocol) and sends it to the call processor application 408.

The call processor application 408, interprets this message and prepares another message to request the execution of a dial tone application function from the network 410. The message contains the address of the dial tone application and the address of the terminal to which the dial tone will be sent. The dial tone application (from the bank of applications 418) will receive the request on its network interface communication block 610. The address of the terminal 414 is recorded in memory 605, the processor 600 determines which dial tone generator application 615 it can allot to this address and this match is also recorded in memory 605.

The processor 600 will then request to the network 410, through its network interface/communication block 610, the establishment of a bearer path on network 410 directly to terminal 414. Once the bearer path is established between the application 418 and the terminal 414, the dial tone generation application 615 will send the tone on the network 410. The tone will be received by the network interface/communication block 510 of terminal server 402. The packet translation 535 block will translate the IP packets in the appropriate format to communicate with terminal 414. The message containing the dial tone will then be forwarded to terminal 414 through the terminal interface/communication block 511.

At this point, the end user hears the dial tone prompt and starts entering digits on his terminal 414. As soon as the first digits are received by block 515, the "Dial tone" function is terminated. The digits are recognized and collected by terminal resource management block 516 via terminal interface/communication block 511. In the same manner as described earlier, the network access resource management block 515 receives information and prepares a message to be sent to the call processor application 408 through the network interface/communication block 510.

The call processor application 408 records in memory the address of the requesting and requested devices. From the requested address it determines that it will require a trunk access application from server 406. The call processor application 408 builds and sends IP packets to request execution of a trunk access function 715 (FIG. 6) at trunk access server 406. The trunk access 406 server receives the message on its internal network interface/communication block 711. The trunk access server 406 records in memory 705 the requesting and requested address and reserves one of its applications for the communication session. Through its packet translation block 735 and external interfaces/communication block 710, the trunk access server 406 establishes a communication path to the called party via the PSTN 412. This completes the trunk access function. A bearer path is then established from the called terminal (not shown) to the calling terminal 414. A ring back is received at terminal 414 from the PSTN 412. Once the called terminal goes off-hook a second bearer path is established to enable voice communication in both directions. The voice communication session between the two end terminals can then proceed.

The above description of a preferred embodiment of the present invention should not be read in a limitative manner as refinements and variations are possible without departing from the spirit of the invention. The scope of the invention is defined in the appended claims and their equivalents.

The invention claimed is:

1. A distributed system for establishing a voice communication session, the voice communication session being established by executing a series of functions, said distributed system comprising:

a client device constituting an originating point of the voice communication session;

a plurality of servers capable to be placed in a data communicative relationship with said client device, each server being capable to establishing a data exchange transaction with the client device to execute a certain function of the voice communication session, each server being characterized in that it establishes a data exchange transaction with said client device in a manner autonomous from a data exchange transaction between said client device and a different server.

2. A distributed system for establishing a voice communication session as defined in claim 1, wherein each server includes a computing apparatus.

3. A distributed system for establishing a voice communication session as defined in claim 2, wherein said computing apparatus includes a processor in a data communicative relationship with a memory, said memory including a program element executed by said processor to implement an event of the communication session.

4. A private branch exchange network to permit establishing of internal and external voice communication sessions, each voice communication session being established by executing a series of functions, said private branch exchange network including:
- a plurality of servers in a data communicative relationship, each server capable of interacting autonomously from other servers with telephone instruments connected to said network to execute a certain function of a voice communication session;
- said plurality of servers including a PSTN access server to connect said network and the PSTN for establishment of external voice communication sessions.

5. A method for establishing a voice communication session, the voice communication session being established by executing a series of functions, said method comprising:
- providing a client device at which the communication session originates;
- providing a plurality of servers, each server being capable to interact with said client device to execute a certain function of the voice communication session; and
- establishing a plurality of autonomous data exchange transactions between said client device and said servers to execute a series of functions permitting establishment of the voice communication session.

6. A method as defined in claim 5, wherein the establishment of a data exchange transaction between said client device and a server comprises the exchange of data packets between said client device and the server.

7. A method as defined in claim 6, wherein said data packets are IP data packets.

* * * * *